Figure 1:
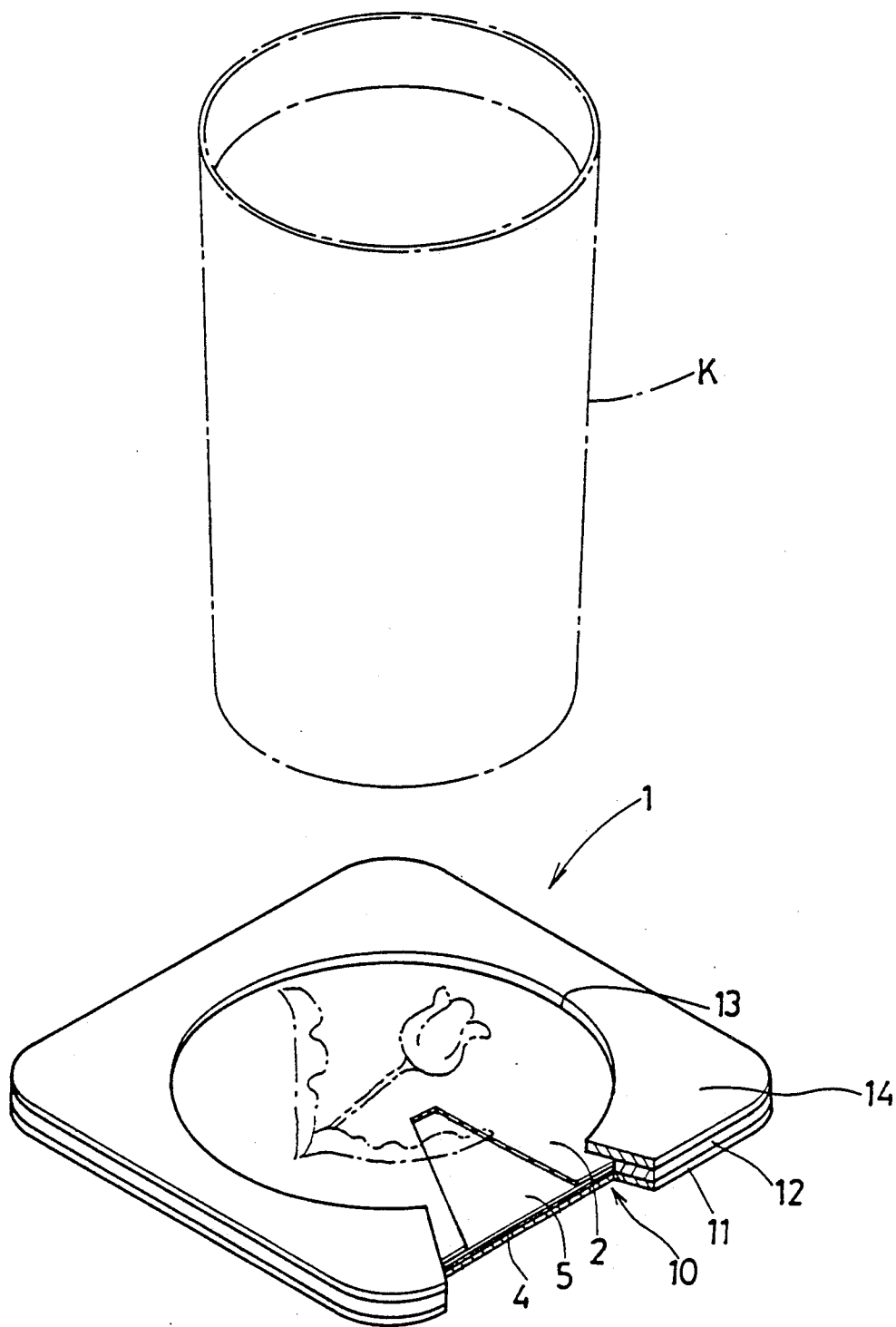

United States Patent [19]

Kawashima

[11] Patent Number: 5,000,413

[45] Date of Patent: Mar. 19, 1991

[54] COASTER FOR GLASS

[76] Inventor: Kiyoharu Kawashima, 5-7 Esaka-cho 5-chome, Suita-shi, Osaka-fu, Japan

[21] Appl. No.: 533,762

[22] Filed: Jun. 6, 1990

[51] Int. Cl.$^5$ ............................................. A47B 91/00
[52] U.S. Cl. .................................. 248/346.1; D7/510; 215/100.5
[58] Field of Search .................. 248/346.1; 215/100.5; D7/510

[56] References Cited

U.S. PATENT DOCUMENTS

| | | | |
|---|---|---|---|
| 3,017,051 | 1/1962 | Rosenfeld | 248/346.1 UX |
| 3,188,040 | 6/1965 | Eichler | 248/346.1 |
| 3,195,847 | 7/1965 | Squires | 248/346.1 |
| 3,515,262 | 6/1970 | Ornstein et al. | 215/100.5 X |
| 4,089,498 | 5/1978 | Woodruff | 248/346.1 |
| 4,206,570 | 6/1980 | Cooper | 248/346.1 X |
| 4,336,574 | 6/1982 | Goodman | 248/346.1 X |
| 4,858,872 | 8/1989 | Witt | 248/346.1 |
| 4,858,873 | 8/1989 | Wilmoth et al. | 248/346.1 |

Primary Examiner—Ramon O. Ramirez
Attorney, Agent, or Firm—Stevens, Davis, Miller & Mosher

[57] ABSTRACT

A coaster of this invention comprises an upper sheet having transparency and permeability, a printed sheet provided with a color-changing area of which surfaces faces the upper sheet, and a color former for changing the color-changing area. The color-changing area is printed by an ink containing a color-changing agent which changes from substantially invisible colorless state to a visible color state by applying a color former. The color former is set in the coaster such a way that the color former can melt out for applying to the color-changing agent by means of water permeating through the upper sheet.

1 Claim, 3 Drawing Sheets

COASTER FOR GLASS

The present invention relates to a coaster for a glass which changes its colors from colorless state to a visible color by dew drops formed on the glass surface when a glass containing a potable liquid is placed on the coaster, or by the potable liquid spilt out of the glass.

When placing a glass containing a potable liquid such as beer, soft drinks and cold water on a table, the table is often soiled by dew drops formed on the glass surface or the potable liquid split out of the glass.

Therefore, in order to prevent a table from being soiled, a glass is often placed on a table by the medium of a coaster.

Such coasters are made by using paper materials having a superior water absorption, and many of them have pictures, letters, graphics or the like printed on the surface by using inks which do not discolor to improve the colorful appearance.

However, as the shape and colors of pictures, letters and graphics printed on the coaster do not change at any time, in an eating house, for example, that sells service, such a coaster lacks time-course changes and can not give strong impressions to customers.

Therefore, a coaster which can demonstrate a variety in one coaster by changing colors while a customer is having food and can be expected for its color-change in order to further attract customers has been required.

The present inventor noticed that in the case that a soft drink, beer or the like is poured into a glass, dews are formed on the outer surface of the glass through the drinks, and that the dews drop onto the coaster of the glass, and attained the invention by changing colors by using the dew drops.

It is hence a primary object of the invention to present a coaster for a glass which can improve the attractive property to its user by changing colors through water passing through its upper sheet, basically comprising an upper sheet having transparency and permeability, a color former placed below it and a printed sheet having a colorless print area which changes colors from colorless state to a visible color by the color former.

According to one aspect of the invention, a coaster for a glass comprising an upper sheet having transparency and permeability, a printed sheet placed below the upper sheet and printed by using an ink containing a color-changing agent which changes from substantially invisible colorless state to a visible color by a color former with its color-changing area formed on the surface facing the upper sheet and the color former, wherein the color former is dissolved by water passing through the upper sheet and changes colors of the printed area.

As the color former is dissolved in water, and the dissolved color former changes colors of the color-changing area, it generates to heat and is safe. As the color-changing area is covered by a transparent upper sheet not to be exposed, it is safe and hygienic.

Moreover, since the color-changing area changes its colors from invisible colorlessness to a visible color, it makes users to imagine the change before the color is developed, to have expectations and increases its attractive properties.

By printing the color-changing area by using plural types of color-changing agents, it is also possible to develop in different colors, respectively, to demonstrate colorful graphics and pictures.

The color-changing agent may maintain the changed color for a continuous color changes, or return to colorless state as the time passes after the color change, and the both can be formed in combination as well.

Figure 2:
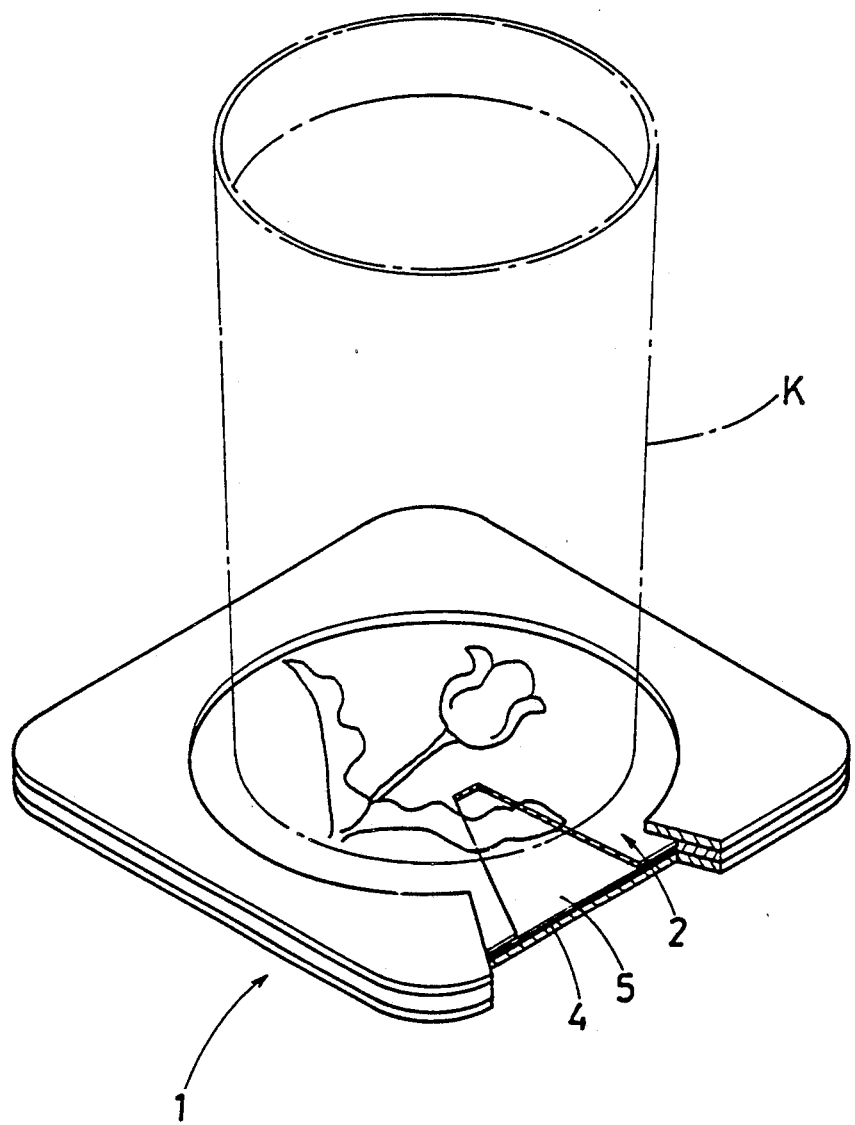
Figure 3:
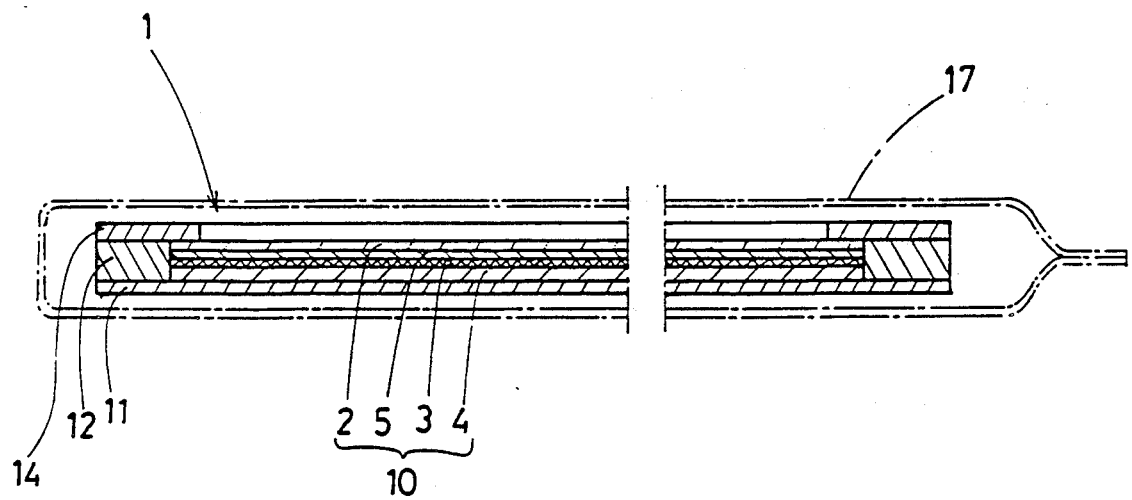
Figure 4:
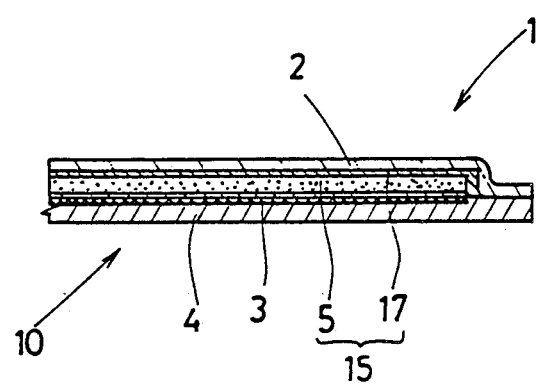

An embodiment of the present invention will now be described by way of example, referring to the attached drawings, in which;

FIG. 1 is a perspective view showning a state of one of the embodiments of the invention before color-change, FIG. 2 is a perspective view showing its state after color-change, FIG. 3 is its sectional view, and FIG. 4 is a sectional view of the other embodiment of the invention.

In FIGS. 1 to 3, a coaster 1 of the invention comprises an upper sheet 2, a printed sheet 4 placed below the upper sheet 2 with its color-changing area 3 formed on the side of the upper sheet 2 and a color former 5 which changes colors of the color-changing area 3, wherein they are laminated in the embodiment in such order from the top to bottom, the upper sheet 2, the color former 5 and the printed sheet 4, and the laminate forms a base sheet 10.

In the embodiment, the base sheet 10 is placed on a bottom place 11 which is wider in comparison with the base sheet 10 and is formed by a thin wooden plate or thick paper, and on the bottom plate 11, a side plate 12 with a perforated part surrounding the circumferential edge of the base sheet 10 and a pressing plate 14 with a perforated part 13 having an over-laying part that over-lays the circumferential edge of the upper surface of the upper sheet 2 placed on the upper surface of the side plate 12 are laminated. Therefore, the upper surface of the upper sheet 2 is exposed through the perforated part 13, and on the upper sheet 2, a glass K is placed directly.

The upper sheet 2 is a translucent sheet made of, for example, filter paper-like material having a number of pores piercing from one side to the other to pass water, and therefore the upper sheet 2 has transparency and permeability. The upper sheet 2 may be also formed by a synthetic resin sheet such as hard vinyl chloride and nylon which is transparent and has many fine pores formed to pierce from one side to the other side of the sheet in place of a filter paper-like material.

On the other hand, the printed sheet 4 is made of impermeable paper or paper with its surface treated for waterproof, or a synthetic resin sheet, and it can also be formed by a thin glass plate.

Color-changing agents and color formers used in the embodiment are described herein below.

As a color-changing agent herein, a pH indicator having a colorless pH range can be used. As such pH indicators, there are γ-dinitrophenol, m-nitrophenol, o-nitrophenol, p-nitrophenol, cyanine, α-naphtholphthalein, phenolphthalein, cresolphthalein, thynolphthalein, ethylmethoxy red, heptamethoxy red or the like, and they can be used depending on colors to be developed. It is also possible to use one or plural types in combination.

As color formers having alkaline pH within a range of pH 7 to 14 of acid, alkali or neutral compounds or the solutions which can regulate pH values, there are sodium carbonate, sodium bicarbonate, ammonia monoethanolamine, ethylamines, propylamines, 2-ethylhexyloxypropylamine, 3-ethoxypropylamine, diisobutylamine, sec-butylamine, isopropanolamine, ethanolamines, 2-ethylhexylamine, ethyleneamines or the like.

As color formers having acidic pH value within a range of pH 1 to 7, there are, for example, acetic acid, formic acid. As color formers offering superior safety which can be dissolved in water passing through the upper sheet as in the invention, sodium carbonate and sodium bicarbonate which have alkaline pH and form powdery shape when dried can be preferably employed.

In order to obtain a clear color-change and to prevent discoloring, it is preferable to add polyhydric alcohols such as ethylene glycol, propylene glycol, polyethylene glycol and glycerine to the color-changing agent or color former.

The type and concentration of color former is determined according to the pH value at which the color-changing agent develops its color. In color formers as well which develop color in a pH range close to neutrality such as nitrophenols, the pH value of the color-reactor ink vehicles is regulated at a lower value beforehand by a nonvolatile pH regulator such as sulfuric acid, tartaric acid and citric acid. This helps to prevent discoloring after printing.

The color-changing agent is prepared as an ink and generally regulated in colorless state. It can also be formulated to present a colorless state by drying or other means after printing.

In order to prepare a color-changing agent into a color-changing ink, a solvent for a color-changing agent such as alcohols is used, and polyhydric alcohols, surface active agents, various types of resins or the like are also added. In the case that colors are developed by using a color former such as water or alcohols after printing, it is preferable to use a water-soluble color-changing ink vehicle as a color-changing ink. As additives for forming water-soluble color-changing ink vehicles, dimethylsulfonamide, dimethylsulfoxide, alcohols, polyhydric alcohols can be used, and as a thickening agent, rosin, shellac, guaiac gum, methylcellulose, ethylcellulose can be used.

Color developing inks can be arranged by either mixing and kneading color-changing agents ground into fine grains with different types of ink vehicles, or by mixing and kneading color-changing agents after being dissolved in solutions and adhered to proper inorganic or organic powder with different types of ink vehicles.

The color-changing area 3 is printed by using an ink containing the color-changing agent. It is also formed in such manner that plural colors can be developed by printing to overlay plural inks containing different color-changing agents and acting the color former.

By changing pH values of the color-changing agent, it is also possible to maintain the color-change or returns to colorless state after the color-change by the action with a color former regulated at a single pH value.

The color former 5 forms a water-soluble transparent film over the color-changing area 3, and by forming in dehydrated dry powder and applying it to adhere on the film by mixing an adhesive to form a film covering approximately the entire area of the color-changing area 3.

The color former 5 may also be applied in a dissolved state on the lower surface of the printed sheet 4 and overlaid on the printed sheet 4 and the color-changing area 3 after drying to dehydrate completely.

In addition, as shown in FIG. 4, and color former 5 in powdery shape may be covered by a water-soluble thin film to form a thin plate 15, which may be placed between the upper sheet 2 and the color-changing area 3 of the printed sheet 4.

It is preferably to protect the coaster 1 from moisture by covering it with a cover 17 shown in FIG. 3 in storing it before use, and in place of the cover, a moisture-proof treatment may be also employed by applying an airtight sheet over the upper surface of the uper sheet 2.

By such means, as shown in FIG. 1, the color-changing agent 3 maintains the invisible colorlessness until the glass K is placed on it. By placing the glass K filled with a potable liquid on the upper sheet 2 as shown in FIG. 2, dew formation occurs on the outer surface of the glass K, and the dew drops fall onto the upper sheet 2.

The aqueous drops on the upper sheet 2 scatter and penetrate the upper sheet 2 to reach the color former 5. The color former 5 is dissolved by mixing with the aqueous drops and is developed on the surface of the color-changing area 3.

The color-changing agent formed in the color-changing area 3 reacts to the color developing solution containing the color forming ability, changes its color from colorlessness to a visible color, and pictures, graphics, letters and the like that are printed in the color-changing area 3 can be observed through the upper sheet 2.

For the coaster 1 of the invention, there are new applications mentioned herein below.

1. As it changes to a visible color in a while after placing the glass K on, it can promote the expectation of its user and increases interests.

2. In the case that plural types of graphics are printed in the color-changing area 3, it can further increase the user's expectation.

3. Moreover, by making plural types with different letters and pictures in the color-changing area 3, the coaster 1 of the invention can be used as a lottery as well.

Thus, applications that a conventional coaster could not offer could be developed.

As shown in FIG. 4, a coaster of the invention may be formed only by an upper sheet, a color former and a printed sheet without employing a frame, and thus the invention can be transformed into various shapes.

As mentioned herein above, by employing the aforementioned structure, a coaster of the invention can change colors from colorless state to a visible color with dew drops on a glass or potable liquid spilt out of the glass, thus further attracting a user, and new applications that have not be possible in conventional coasters can be developed such as lottery.

I claim:

1. A coaster for an impermeable glass comprising an upper sheet having transparency and permeability, an printed sheet placed below the upper sheet having a printed area, printed by using an ink containing a color-changing agent which changes from a substantially invisible colorless state to a visible color by a color former having a color-changing area formed on the surface facing the upper sheet, wherein the color former changes the colors of the printed area by means of water permeating through the upper sheet.

* * * * *